Dec. 18, 1962  V. W. PILKINGTON ETAL  3,068,952
CONTROL OF PASSENGER SERVICE VEHICLES
Filed Feb. 5, 1960  3 Sheets-Sheet 1
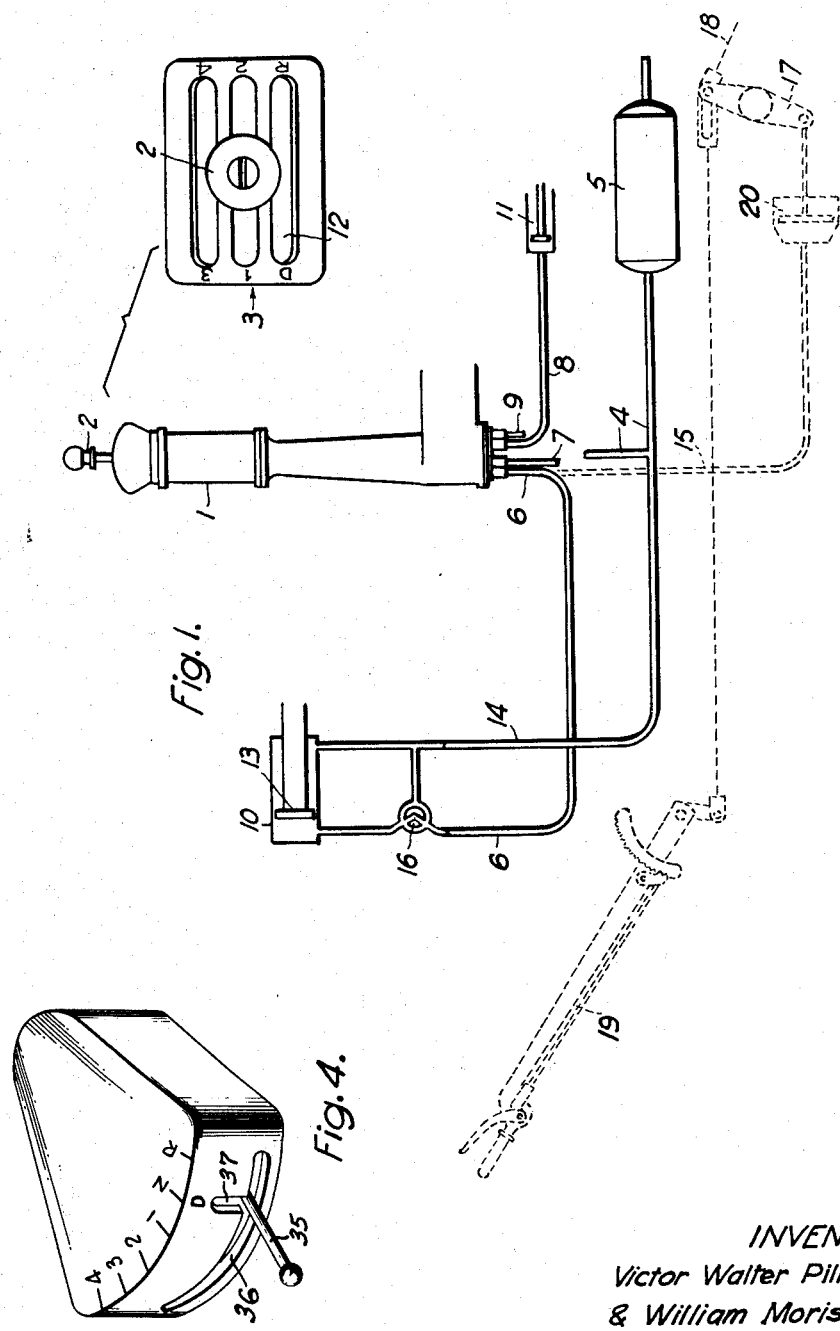
INVENTORS
Victor Walter Pilkington
& William Morison Little
BY
ATTORNEY Dec. 18, 1962 V. W. PILKINGTON ETAL 3,068,952
CONTROL OF PASSENGER SERVICE VEHICLES
Filed Feb. 5, 1960 3 Sheets-Sheet 2
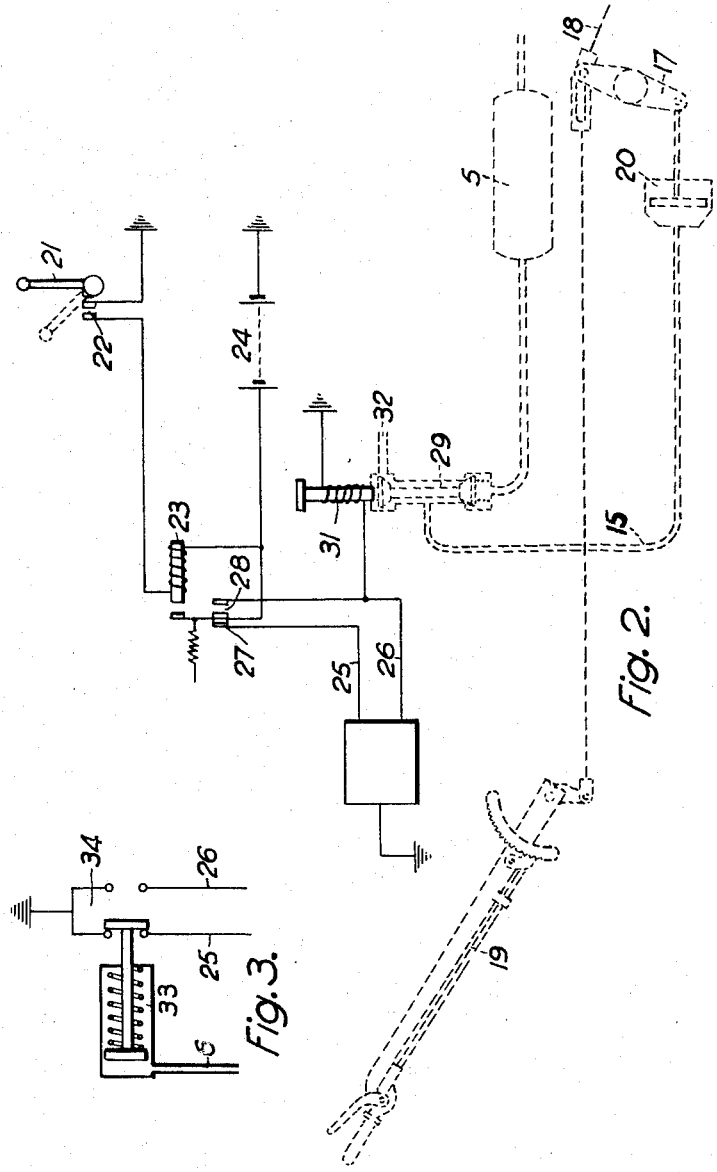
INVENTORS
Victor Walter Pilkington
& William Morison Little
BY
ATTORNEY Dec. 18, 1962   V. W. PILKINGTON ETAL   3,068,952
CONTROL OF PASSENGER SERVICE VEHICLES
Filed Feb. 5, 1960   3 Sheets-Sheet 3
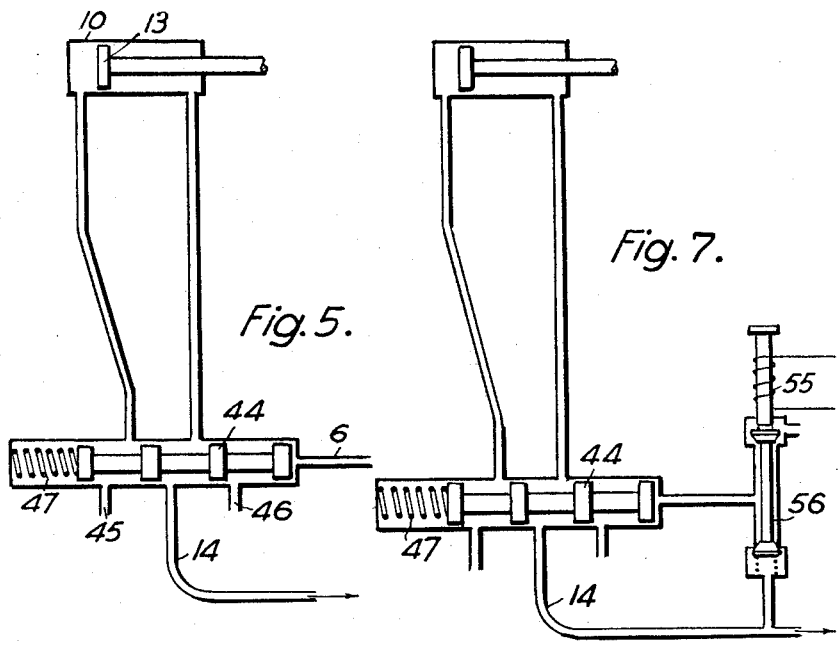
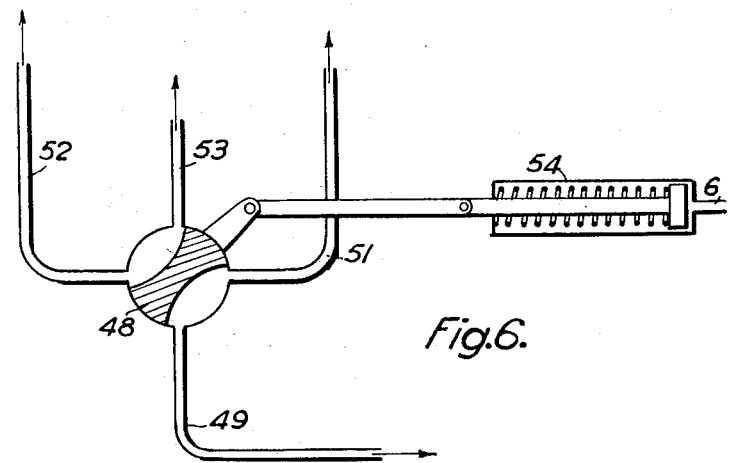
INVENTORS
Victor Walter Pilkington
& William Morison Little
BY
ATTORNEY

United States Patent Office 3,068,952
Patented Dec. 18, 1962

3,068,952
CONTROL OF PASSENGER SERVICE VEHICLES
Victor Walter Pilkington, Leyland, England, and William Morison Little, Edinburgh, Scotland; said Little, assignor of one-half to Leyland Motors Limited, Leyland, England
Filed Feb. 5, 1960, Ser. No. 7,062
3 Claims. (Cl. 180—82)

It is already usual to relieve the driver of a large passenger vehicle of much physical exertion by providing for power operation of, for instance, gear changing and brake application. It is desirable also, especially in the case of city omnibuses which must make frequent stops, to reduce and simplify the manipulation of controls as far as possible. At present, in general, in coming to a halt the driver must disengage his clutch, apply his brakes in a gradual manner reducing the braking as stand-still is neared, steer his vehicle to the side of the road, and finally bring his gear lever to neutral and apply his handbrake. It is also common to have the driver open and close the doors of the vehicle by remote control, and though the doors may be powered-operated this duty requires him to shift his hand to a door-control button or lever both on coming to a stop and before starting, and starting involves a like multiplicity of operations.

The present invention simplifies the driver's work by using the gear lever to control the doors or both the handbrake and the doors. An additional notch is provided in the gear lever gate or equivalent, and the driver ends his manipulation for stopping by bringing his gear lever to neutral and then into the additional notch for door control and handbrake operation.

Application of the handbrake ought to be preceded by operation of the usual brake control pedal; and opening of the door should follow only upon the vehicle being brought to rest. To ensure this, entry of the gear lever into the additional notch for door operation or both door operation and handbrake application may be barred by a latch unless and until the brake pedal is depressed. Moreover, a dashpot may defer release of the latch long enough for the pedal-controlled brakes to act.

There are many mechanisms known, and in use, for effecting gear changes, applying brakes and opening doors, generally by the aid of pneumatic power in either a pressure system or a vacuum system or of hydraulic or electric power. There is no need to describe them since they are to be found in relevant text-books as well as in use. The invention is applicable whatever the mechanism in use. The accompanying drawings show how the invention may be applied in several typical cases.

FIG. 1 refers to a system in which both doors and gears are operated pneumatically;

FIG. 2 to a system in which both doors and gears are controlled electrically;

FIG. 3 shows a modification of the scheme of FIG. 1 to adapt it to a vehicle in which the gears are operated pneumatically and the door electrically;

FIG. 4 indicates how the invention is applied when gear changes are pre-selected by a selector lever moving over a quadrant;

FIGS. 5, 6 and 7 are modifications of the scheme of FIG. 1.

The pneumatic gear control mechanism shown at 1 in FIG. 1 may be taken to be that fully described and illustrated in our British patent specification 740,459. The present invention is by no means limited to that mechanism and the details of it are not material and are therefore not illustrated. For the present purpose it is enough that the gear level 2, moving in a usual gate such as that shown at 3 beside the mechanism 1, opens one or other of a number of valves which make connection between an incoming pipe 4 from a pressure air reservoir 5 and outgoing pipes such as 6, 7, 8, 9 which extend to pneumatic motors for power operation. The pipes shown are not necessarily all that are present, and of those shown some, as 4, 7 and 9, are broken away to avoid confusion; in fact they all extend to the valves within the part 1. It is sufficient to note that pipe 8, for example, extends to a pneumatic motor 11 which may serve to apply a brake band and thereby render one of several epicyclic gears operative to drive the vehicle.

For the purpose of the invention the gate 3 is formed with an additional notch 12, marked D for door. As stated, in the system of FIG. 1 the door is power operated pneumatically. It is actuated by the differential piston 13 of the pneumatic motor 10. The right hand end of the cylinder of this motor is connected directly and permanently to the reservoir 5 by a pipe 14. The piston is therefore normally pressed to the left and the door thereby held closed. When the gear lever 22 is moved into notch 12 connection is made between reservoir 5 and pipe 6 which opens into the left hand end of the cylinder of motor 10; the piston is therefore pushed to the right and the door is opened. In the pipe 6 there is a manually operable emergency valve 16 by which the door may be opened irrespectively of the gear lever 2 if need arises.

In lieu of, or in addition to, admitting air to the pipe 6 movement of the gear level 2 into notch 12 may admit air to pipe 15 shown in dotted lines as a branch from pipe 6. Pipe 15 extends to a pneumatic motor 20 which through lever 17 and pull rod 18 operates a handbrake or parking brake operable in existing vehicles only by, and now operable also by, a hand lever 19 in well known manner.

In FIG. 2 gear changes and door opening and closing are effected by electrical means. The gear lever 21 moving in a gate such as is shown beside FIG. 1, closes electrical contacts in its several positions; in the positions marked 1, 2, 3, 4 and R in FIG. 1 it closes the circuit of gear operating magnets, for instance brake magnets, by which one of four forward gears or a reverse gear is engaged. When moved to notch 12 the gear lever closes the contact 22, thereby causing excitation of the relay 23 from the battery 24. The electrical door-operating mechanism is connected between earth and leads 25, 26, and its circuit is normally closed through contact 27 and lead 25 so that the door is held closed. When relay 23 is excited contact 27 is interrupted and contact 28 is closed, thereby applying battery 24 to lead 26 and causing the door to open.

In addition, the contact 28 may close the circuit of handbrake control mechanism. For this purpose a magnetically operated valve 29 is provided to connect the brake-actuating pneumatic motor 20 with the reservoir 5. The magnet is shown at 31 as branched from the lead 26. In the position shown valve 29 connects the motor 20 to exhaust at 32, and the connection to the reservoir is closed. When magnet 31 is excited pipe 15 is closed to exhaust and connected to the reservoir 5.

If the brakes are operated pneumatically and the door electrically, the door may nevertheless be controlled in substantially the manner shown in FIG. 1 with the modification shown in FIG. 3. On movement to the notch 12 the gear lever opens a valve connecting pneumatic motor 33 with the reservoir 5. The motor actuates a switch 34 which in the position shown connects lead 25 of the electrical door operating mechanism to earth thereby holding the door closed, and when air is admitted to the cylinder disconnects lead 25 and earths lead 26 thereby causing the door to open.

If the speed gears are pre-selected by a lever 35 moving in a quadrantal slot 36 as shown in FIG. 4, the door notch 37 corresponding to 12 in FIG. 1 is a lateral extension of the slot 36 at the neutral position designated by N. To open the door or both to open the door and apply the parking brake, the driver first moves his preselecting lever 35 to neutral position and then moves it, or allows it to move under spring action, into the notch 37. In this movement the lever closes electrical contacts thereby operating the door or the door and the parking brake as described, for instance, with reference to FIG. 2.

FIG. 5 shows a modification of the scheme illustrated in FIG. 1 in respect to the control of the door-operating motor 10. The pipes 6 and 14 no longer connect directly with the motor, but instead to a shuttle valve 44 which controls admission of air to the ends of the motor cylinder and connection to exhaust at 45 and 46. The valve 44 is normally held in its right hand position, as shown, by spring 47, and therefore the right hand end of the cylinder of motor 10 is connected to the air reservoir 5 through pipe 14 as in FIG. 1. When the gear lever is brought to the door control notch, pipe 6 is connected to the reservoir and the air pressure pushes the valve 44 to the left against the action of spring 47. The right hand end of the cylinder of motor 10 is thereby connected to exhaust at 46, and the left hand end is cut off from exhaust 45 and connected to pipe 14; the piston 13 therefore moves to the right and opens the door.

It is desirable that the invention shall be applicable as readily as possible to existing vehicles. FIG. 6 shows how a manually-controlled pneumatically-operated door mechanism may be modified for the purpose of the invention. A rotary valve 48, formerly manually operated, makes connection in the position shown between the pipe 49 extending to the reservoir 5 and a pipe 51 leading to the right hand end of the cylinder of a motor such as 10. If rocked anti-clockwise through an angle of 90° valve 48 connects the reservoir through pipe 49 and pipe 52 to the left hand end of the cylinder and connects pipe 51 to exhaust at 53, so causing the door to open. For the purpose of the invention the valve is no longer turned by hand but by the motor 54 which is supplied through pipe 6 when the gear lever is brought to door opening position.

FIG. 7 shows the scheme of FIG. 5 applied, not to the pneumatically operated system of FIG. 1 but to the electrically operated system of FIG. 2. The gear lever when brought to door-opening notch closes the circuit of solenoid 55 which operates valve 56 as in the handbrake operating mechanism of FIG. 2, thereby admitting air to thrust the shuttle valve 44 to the left.

It is believed these examples suffice to enable a competent person to apply the invention to any new vehicle in conjunction with whatever method of gear operation is preferred, and to apply it to existing vehicles whatever the system of operation in use. The examples sufficiently show, for instance, that hand brake operation could be copied from FIG. 1 and door operation from FIG. 2; and any such scheme, or any of the schemes illustrated, could be controlled by a pre-selector lever as in FIG. 4 instead of by a gear lever moving in a gate of the pattern shown in FIG. 1.

We claim:

1. In a motor road passenger vehicle having a lever-controlled change speed gear box and power-operated door-opening mechanism, a gear lever movable into defined positions corresponding to engagement of the several gears, into a neutral position corresponding to disengagement of all the said gears, and into a further defined position accessible only from the neutral position and likewise corresponding to gear disengagement, power-operated door-opening mechanism and means actuated by the gear lever for applying power to said mechanism when the said lever is brought to the said further defined position.

2. In a motor road passenger vehicle having a lever-controlled change speed gear box and power-operated door-opening mechanism, a gear lever movable into defined positions corresponding to engagement of the several gears, into a neutral position corresponding to disengagement of all of the said gears, and into a further defined position accessible only from the neutral position and likewise corresponding to gear disengagement, power-operated braking mechanism and means actuated by the gear lever for applying power to said door-opening and braking mechanisms when the said lever is brought to the said further defined position.

3. In a motor road vehicle having a power-operated and lever-controlled change speed gear box, a gear lever movable to defined positions to apply power to engage corresponding gears and to a neutral position to disengage all gears, and also to a further position accessible only from the neutral position, power-operated door-opening mechanism, and means actuated by the gear lever in said further position for applying power to open the door, whereby the driver may open the door without removing his hand from the gear lever, cannot open it until all gears are disengaged, and cannot engage a gear without permitting the door to close.

References Cited in the file of this patent

UNITED STATES PATENTS

| | | |
|---|---|---|
| 2,194,782 | Baade | Mar. 26, 1940 |
| 2,311,860 | Almond | Feb. 23, 1943 |
| 2,318,610 | Hyatt et al. | May 11, 1943 |
| 2,617,316 | Randol | Nov. 11, 1952 |
| 2,848,988 | Binder | Aug. 26, 1958 |
| 2,867,310 | Martin | Jan. 6, 1959 |
| 2,974,752 | Howard | Mar. 14, 1961 |

UNITED STATES PATENT OFFICE
CERTIFICATE OF CORRECTION

Patent No. 3,068,952                                    December 18, 1962

Victor Walter Pilkington et al.

It is hereby certified that error appears in the above numbered patent requiring correction and that the said Letters Patent should read as corrected below.

In the grant, lines 2 and 3, and in the heading to the printed specification, lines 4 and 5, for "; said Little assignor of one-half to Leyland Motors Limited" read --, assignors to Leyland Motors Limited --; lines 13 and 14, for "Victor Walter Pilkington, his heirs or assigns, and Leyland Motors Limited" read -- Leyland Motors Limited, its successors --.

Signed and sealed this 1st day of October 1963.

(SEAL)
Attest:

ERNEST W. SWIDER                                        DAVID L. LADD

Attesting Officer                                          Commissioner of Patents